(12) United States Patent  
He et al.

(10) Patent No.: US 7,432,828 B2
(45) Date of Patent: Oct. 7, 2008

(54) DYNAMIC LATERAL DEVIATION DISPLAY

(75) Inventors: Gang He, Morristown, NJ (US); Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 396 days.

(21) Appl. No.: 11/353,555

(22) Filed: Feb. 14, 2006

(65) Prior Publication Data

US 2007/0188350 A1    Aug. 16, 2007

(51) Int. Cl.
G08B 21/00 (2006.01)
G08B 23/00 (2006.01)
G01C 21/00 (2006.01)
G01C 23/00 (2006.01)
G05D 1/00 (2006.01)
G05D 3/00 (2006.01)
G06F 17/00 (2006.01)
G06G 7/76 (2006.01)

(52) U.S. Cl. .................. 340/945; 340/967; 340/973; 340/974; 340/979; 340/980; 340/438; 701/1; 701/2; 701/3; 701/4; 701/14

(58) Field of Classification Search .................. 340/438, 340/945, 963, 967, 973, 974, 979, 980; 701/1–14
See application file for complete search history.

(56) References Cited

U.S. PATENT DOCUMENTS

| 4,090,189 A | 5/1978 | Fisler |
| 4,241,294 A | 12/1980 | Fisler |
| 4,358,713 A | 11/1982 | Senoo et al. |
| 4,514,727 A | 4/1985 | Van Antwerp |
| 4,868,652 A | 9/1989 | Nutton |
| 5,201,032 A | 4/1993 | Kurose |
| 5,202,668 A | 4/1993 | Nagami |
| 5,343,395 A | 8/1994 | Watts |
| 5,426,727 A | 6/1995 | Sugiura et al. |
| 5,745,095 A | 4/1998 | Parchem et al. |
| 5,745,863 A | 4/1998 | Uhlenhop et al. |
| 5,747,863 A | 5/1998 | Shoda |
| 5,757,127 A | 5/1998 | Inoguchi et al. |
| 6,057,856 A | 5/2000 | Miyashita et al. |
| 6,166,744 A | 12/2000 | Jaszlics et al. |
| 6,208,933 B1 | 3/2001 | Lazar |
| 6,285,926 B1 * | 9/2001 | Weiler et al. .................. 701/4 |
| 6,327,089 B1 | 12/2001 | Hosaki et al. |
| 6,359,737 B1 | 3/2002 | Stringfellow |
| 6,486,856 B1 | 11/2002 | Zink |
| 6,496,670 B1 | 12/2002 | Michaelson et al. |

(Continued)

*Primary Examiner*—George A Bugg
*Assistant Examiner*—Lam P Pham
(74) *Attorney, Agent, or Firm*—Ingrassia, Fisher & Lorenz, P.C.

(57) ABSTRACT

A method of dynamically displaying lateral deviation in formats on a display is provided. The method comprises assigning one or more positional boundaries for displaying the lateral deviation information, wherein the one or more positional boundaries define areas on a display. The method also comprises calculating display positions of a lateral deviation symbology and determining if each calculated display position is allowed based on where the lateral deviation display would be located, if displayed at each calculated position, in relation to the one or more positional boundaries. The method further comprises, displaying the lateral deviation symbology at the calculated positions when the calculated positions are allowed, and displaying a lateral deviation indicator when the calculated positions are not allowed.

25 Claims, 6 Drawing Sheets

U.S. PATENT DOCUMENTS

| | | |
|---|---|---|
| 6,504,518 B1 | 1/2003 | Kuwayama et al. |
| 6,545,677 B2 | 4/2003 | Brown |
| 6,545,803 B1 | 4/2003 | Sakuma et al. |
| 6,570,559 B1 | 5/2003 | Oshima |
| 6,570,581 B1 | 5/2003 | Smith |
| 6,618,045 B1 | 9/2003 | Lin |
| 6,636,277 B2 | 10/2003 | Eberhardt et al. |
| 6,650,340 B1 | 11/2003 | Georges et al. |
| 6,678,588 B2 | 1/2004 | He |
| 6,690,296 B2 | 2/2004 | Corwin et al. |
| 6,690,299 B1 | 2/2004 | Suiter |
| 6,690,351 B1 | 2/2004 | Wong |
| 6,700,482 B2 | 3/2004 | Ververs et al. |
| 6,703,945 B2 | 3/2004 | Kuntman et al. |
| 6,727,489 B2 | 4/2004 | Yano |
| 6,744,478 B1 | 6/2004 | Asakura et al. |
| 6,747,650 B2 | 6/2004 | Turner et al. |
| 6,762,801 B2 | 7/2004 | Weiss et al. |
| 6,885,313 B2 * | 4/2005 | Selk et al. .................... 340/945 |
| 2002/0167536 A1 | 11/2002 | Valdes et al. |
| 2002/0171639 A1 | 11/2002 | Ben-David |
| 2003/0016236 A1 | 1/2003 | Bronson |
| 2003/0122810 A1 | 7/2003 | Tsirkel et al. |
| 2004/0201589 A1 | 10/2004 | Ekstrom |
| 2004/0201596 A1 | 10/2004 | Coldefy et al. |
| 2005/0007261 A1 | 1/2005 | Berson et al. |
| 2005/0007386 A1 | 1/2005 | Berson et al. |
| 2007/0085705 A1 * | 4/2007 | He et al. ..................... 340/967 |

* cited by examiner

DYNAMIC LATERAL DEVIATION DISPLAY

TECHNICAL FIELD

The present invention generally relates to graphical displays and, in particular, to dynamic lateral deviation displays.

BACKGROUND

Perspective conformal lateral deviation symbology provides intuitive displays to flight crews of current position in relation to an intended flight path. In particular, lateral deviation symbology indicates to a flight crew the amount by which the aircraft has deviated to the left or right of an intended course. Deviation bars on perspective conformal lateral deviation symbology represent a fixed ground distance from the intended flight path. As the aircraft pitches, ascends or descends, the display distance between the deviation bars will vary. However, the actual ground distance from the intended flight path represented by the deviation bars remains the same. Therefore, flight crews can determine position information with reduced workload by merely observing the position of the aircraft in relation to the deviation bars. Regardless of attitude or altitude, flight crews know how far off course an aircraft is if the aircraft is a given number of deviation bars from the intended flight path.

In order to maintain the conformal view, the lateral deviation symbology moves on the display in relation to movement of the intended flight path's display position. However, due to that movement, the symbology can temporarily disappear from the display at certain attitude and heading orientations. For example, if the aircraft is too far off course, the symbology may move too far to the left or right and, consequently, move off the display. Likewise, if the aircraft is at too great a pitch angle, the symbology may move off the top or bottom of the display. Flight crews, therefore, do not have a continuous display of lateral deviation information. An additional problem is that the symbology may move and overlap other primary flight information such as altitude or ground speed tapes. This overlapping makes it more difficult to view the primary flight information and the lateral deviation symbology.

For the reasons stated above, and for other reasons stated below which will become apparent to those skilled in the art upon reading and understanding the present specification, there is a need in the art for a dynamic lateral deviation display which enables flight crews to continuously determine lateral deviation information, regardless of attitude or heading, while not interfering with other primary flight information.

SUMMARY

Embodiments of the present invention solve problem of providing a dynamic lateral deviation display which enables flight crews to continuously determine lateral deviation information, regardless of attitude or heading, while not interfering with other primary flight information.

In one embodiment, a method of dynamically displaying lateral deviation in formats on a display is provided. The method comprises assigning one or more positional boundaries for displaying the lateral deviation information, wherein the one or more positional boundaries define areas on a display. The method also comprises calculating display positions of a lateral deviation symbology and determining if each calculated display position is allowed based on where the lateral deviation symbology would be located, if displayed at each calculated position, in relation to the one or more positional boundaries. The method further comprises, displaying the lateral deviation symbology at the calculated positions when the calculated positions are allowed, and displaying a lateral deviation indicator when the calculated positions are not allowed.

In another embodiment, a graphic display system is provided. The graphic display system comprises one or more sensors for collecting craft lateral deviation data, a display element for displaying craft lateral deviation data, and at least one processor coupled to the one or more sensors and the display element for processing the lateral deviation data and sending signals to the display element to direct the display element in displaying the lateral deviation data. The processor calculates display positions for a lateral deviation symbology, determines if each of the calculated display positions are allowed, and sends signals to the display element to display the lateral deviation symbology at the calculated display positions when the calculated display positions are allowed. The processor also sends signals to the display element to display a lateral deviation indicator when the calculated display positions are not allowed.

In another embodiment, a computer readable medium having computer-executable instructions for performing a method of dynamically displaying lateral deviation in formats on a display is provided. The method comprises determining if calculated display positions of a lateral deviation symbology are allowed based on the location of the lateral deviation symbology, if displayed at the calculated display positions, in relation to areas defined on a display by positional boundaries, and transitioning between the lateral deviation symbology and a lateral deviation indicator based on the determination if calculated display positions are allowed.

In another embodiment, a method of dynamically displaying lateral deviation in formats on a display is provided. The method comprises assigning one or more positional boundaries for displaying the lateral deviation information, wherein the one or more positional boundaries define areas on a display. The method also comprises calculating display positions of a partially conformal lateral deviation symbology and determining if each calculated display position is allowed based on where the partially conformal lateral deviation symbology would be located, if displayed at each calculated position, in relation to the one or more positional boundaries. The method further comprises, displaying the partially conformal lateral deviation symbology at the calculated positions when the calculated positions are allowed, and transitioning the partially conformal lateral deviation symbology to a non-conformal lateral deviation symbology when the calculated positions are not allowed.

In yet another embodiment, a graphic display system is provided. The display system comprises means for collecting craft lateral deviation data, and means for displaying craft lateral deviation data in a lateral deviation symbology. The display system also comprises means for determining if a calculated display position of the lateral deviation symbology is allowed based on where the lateral deviation symbology would be displayed, if at the calculated display position, in relation to at least one area defined by positional boundaries, and for transitioning the lateral deviation symbology to a lateral deviation indicator when the calculated display position of the lateral deviation symbology is not allowed.

DRAWINGS

DETAILED DESCRIPTION

Figure 1:
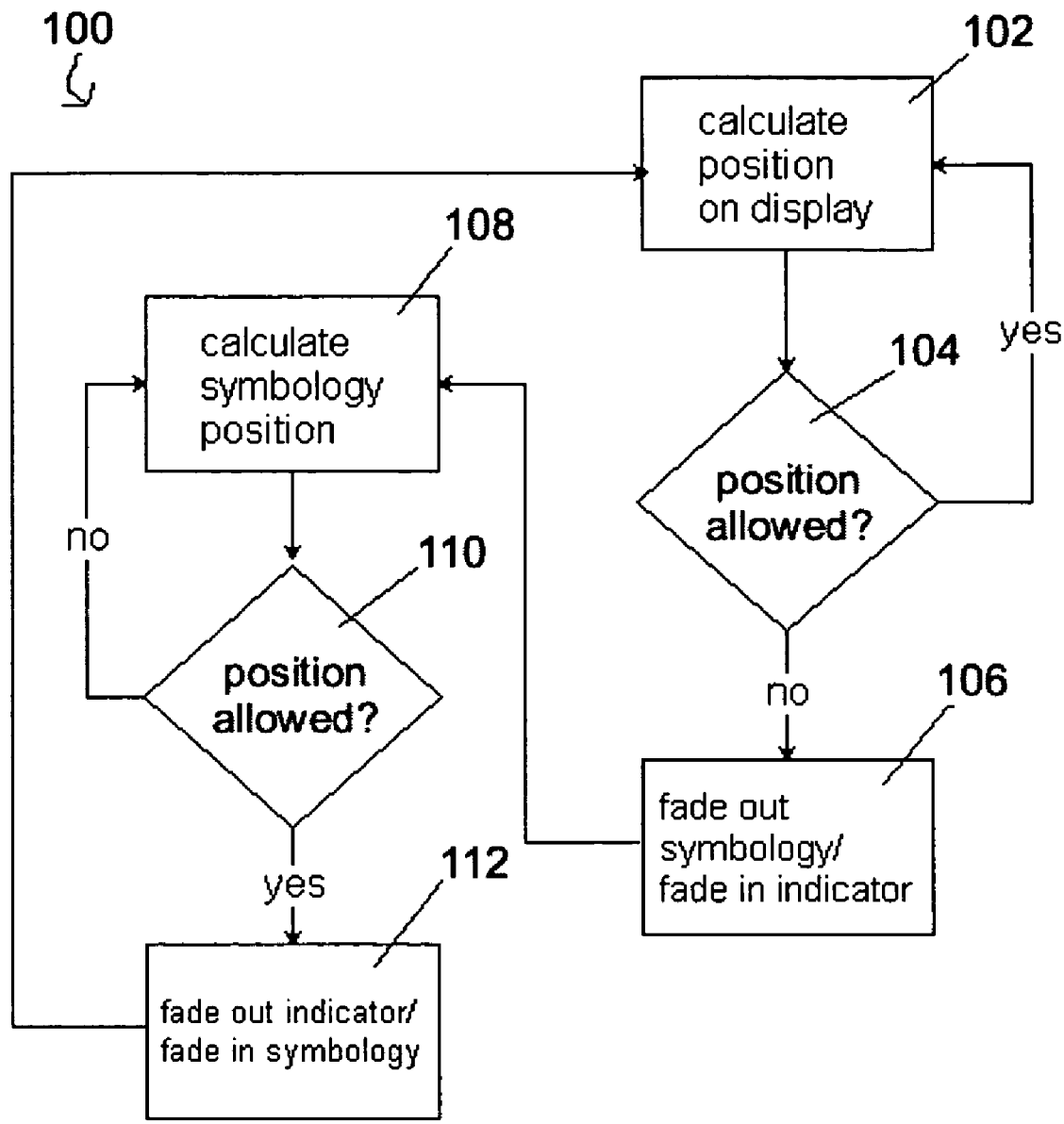
FIG. 1 is a flow chart showing a method of providing a dynamic lateral deviation display according to one embodiment of the present invention.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. Furthermore, it will be understood by one of skill in the art that although the specific embodiments illustrated below are directed at aircraft for purposes of explanation, the method and apparatus may be used in various embodiments employing various types of crafts, such as space craft, helicopters, and unmanned air vehicles (UAV). Moreover, embodiments of the present invention are suitable for use on CRT, LCD, plasma displays, organic LED or any other existing or later developed display technology.

It should also be understood that exemplary methods illustrated may include additional or fewer steps or may be performed in the context of a larger processing scheme. Furthermore, methods presented in the drawing figures and specification are not to be construed as limiting the order in which the individual steps may be performed. Instructions for carrying out the various methods, process tasks, calculations, control functions, and the generation of display signals and other data used in the operation of the display system are implemented in software programs, firmware or computer readable instructions. These instructions are typically stored on any appropriate medium used for storage of computer readable instructions such as floppy disks, conventional hard disks, CD-ROM, flash memory ROM, nonvolatile ROM, RAM, and other like medium. The following detailed description is, therefore, not to be taken in a limiting sense.

Embodiments of the present invention enable flight crews to continue utilizing the benefits of a perspective conformal lateral deviation symbology while still maintaining continual awareness of lateral deviation when conformal lateral deviation symbology disappears. Embodiments of the present invention accomplish this by dynamically transitioning between a conformal lateral deviation symbology and a non-conformal lateral deviation indicator.

FIG. 1 is a flow chart showing a method 100 of dynamically displaying lateral deviation in formats on a display according to one embodiment of the present invention. At 102, a display position for a lateral deviation symbology is calculated. The position is calculated using graphic rendering techniques known to one of skill in the art. In some embodiments the lateral deviation symbology is fully conformal. A fully conformal lateral deviation symbology is conformal to the intended flight path, also referred to herein as a center line, as well as conformal to the distance between deviation bars with reference to the ground. Deviation bars in the lateral deviation symbology spread out and compress based on changes in the craft's state. Changes in a craft's state include, but are not limited to, one or more of attitude changes, altitude changes, and heading changes. For example, since separations between the deviation bars represent a fixed ground distance, as an aircraft increase its altitude, the deviation bars will compress in towards each other. As the altitude decreases, the deviation bars will spread out. This enables a flight crew to easily ascertain an approximate deviation distances based on the deviation bars.

In other embodiments, the lateral deviation symbology is partially conformal. Partially conformal means that the center point of the lateral deviation symbology is tied to the center line. However, deviation bars about the center line are not conformal. The distance between the deviation bars is a fixed distance on the display and remains the same as the craft's state changes. However, as the craft's state changes the partially conformal lateral deviation symbology will move relative to the center line with the center of the partially conformal lateral deviation symbology being tied to the center line. Although a partial conformal lateral deviation symbology lacks some of the benefit of conformal deviation bars, it reduces possible confusion or distraction which may result from extreme spreading out and compressing of the deviation bars based on craft state changes. An exemplary embodiment of a partially conformal lateral deviation symbology is shown and described in more detail with regards to FIG. 5.

At 104, it is determined if calculated display positions of the lateral deviation symbology are allowed based on where the lateral devation symbology would be displayed, if allowed, in relation to areas defined by positional boundaries. The calculated positions vary based on the craft state relative to the intended flight path. In some embodiments, the positional boundaries define areas wherein the lateral deviation symbology should not be displayed. If the calculated position would locate at least a part of the lateral deviation symbology inside the areas, if displayed at that position, the calculated position is not allowed. For example, in some embodiments, the positional boundaries define areas occupied by other primary flight display (PFD) symbology. If a calculated display position indicates at least a part of the lateral deviation symbology would be within an area occupied by other PFD symbology, the calculated position is not allowed because the lateral deviation symbology would overlap the PFD symbology if displayed at that position.

In other embodiments, the positional boundaries define areas within which the lateral deviation symbology should be displayed. If a calculated display position indicates that at least a part of the lateral deviation symbology would be outside the allowed area, if displayed at that position, the calculated position is not allowed. For example, in some embodiments, the positional boundaries define an area between PFD tapes (e.g. altitude and ground speed tapes). PFD tapes are shown in more detail below with regards to FIG. 3. This limits the area where the lateral deviation symbology is allowed to an area between the PFD tapes. Hence, the scan area for a flight crew is reduced making it easier to locate the lateral deviation symbology on a display.

In other embodiments, positional boundaries include boundaries of the display element upon which the lateral deviation symbology is displayed. If it is determined that at a calculated display position at least a part of the lateral deviation symbology would be located outside of the viewing area of a display element, the calculated position is not allowed. In some such embodiments, the viewing area of a display element is also divided into sections, one of which displays perspective conformal graphics. In such embodiments, positional boundaries include a border dividing a section which displays perspective conformal graphics, including the lateral deviation symbology, from other sections on a display element. If a calculated position indicates that at least a part of the lateral deviation symbology would be displayed on the display element outside the section containing the perspective conformal graphics or the calculated position would locate at least a part of the lateral deviation symbology off of the display element, the calculated position is not allowed. In other embodiments, more than one area defined by positional boundaries is used.

If it is determined that the calculated display position of the lateral deviation symbology is allowed, the process returns to 102 where an updated display position of the lateral deviation symbology is calculated. If it is determined that the calculated display position of the lateral deviation symbology is not allowed, the process continues at 106. At 106, the lateral deviation symbology is faded out and a lateral deviation indicator is faded in. In some embodiments, the rate of fading out the lateral deviation symbology and fading in the lateral deviation indicator is based on a rate of change in the craft's state. For example, if the calculated position of the lateral deviation symbology would be outside the positional boundaries defining the viewing area of the display due to a change in the craft's heading, the lateral deviation symbology will fade out at a rate based on the rate of change in the craft's heading. In other embodiments, fading in the lateral deviation indicator and fading out the lateral deviation symbology occurs at a substantially uniform rate over a set time period.

The lateral deviation indicator is non-conformal in that it is not conformal to the center line and the distance between deviation bars remains the same on the display. It does, however, indicate lateral deviation generally. As the lateral deviation symbology fades out of view due to changes in the craft's state, a lateral deviation indicator fades in to continue providing a flight crew with lateral deviation information. A flight crew can then ascertain in what direction the craft must be directed to return to its intended flight path and restore the lateral deviation symbology to the display. In some embodiments, the lateral deviation indicator fades in at a horizontal center position on a display element. In other embodiments, the lateral deviation indicator fades in at a position related to where the lateral deviation symbology faded out so that a flight crew knows where to look for and expect the lateral deviation symbology to return. For example, in one embodiment, the lateral deviation indicator fades into substantially the same position where the lateral deviation symbology was faded out. In other embodiments, the lateral deviation indicator fades into a position in the general direction of where the lateral deviation symbology faded out. The lateral deviation indicator is discussed in more detail in regards to FIG. 4. The method continues at 108.

At 108, based on changes in the craft's state, an updated display position is calculated for the lateral deviation symbology. The position is calculated using techniques known to one of skill in the art. At 110, it is determined if the updated display position is allowed based on where the lateral devation symbology would be displayed, if allowed, in relation to positional boundaries, as described above. If the updated position is not allowed, the method returns to 108 where a new updated display position is calculated based on changes in the craft's state. If the updated display position is allowed, the method continues at 112. At 112, the lateral deviation indicator is faded out and the lateral deviation symbology is faded back in. In some embodiments, the rate of fading in the lateral deviation symbology and fading out the deviation indicator is based on a rate of change in the craft's state. In other embodiments, fading out the lateral deviation indicator and fading in the lateral deviation symbology occurs at a substantially uniform rate over a set time period. The process then returns to 102 where a new updated display position of the lateral deviation symbology is calculated.

Figure 2:
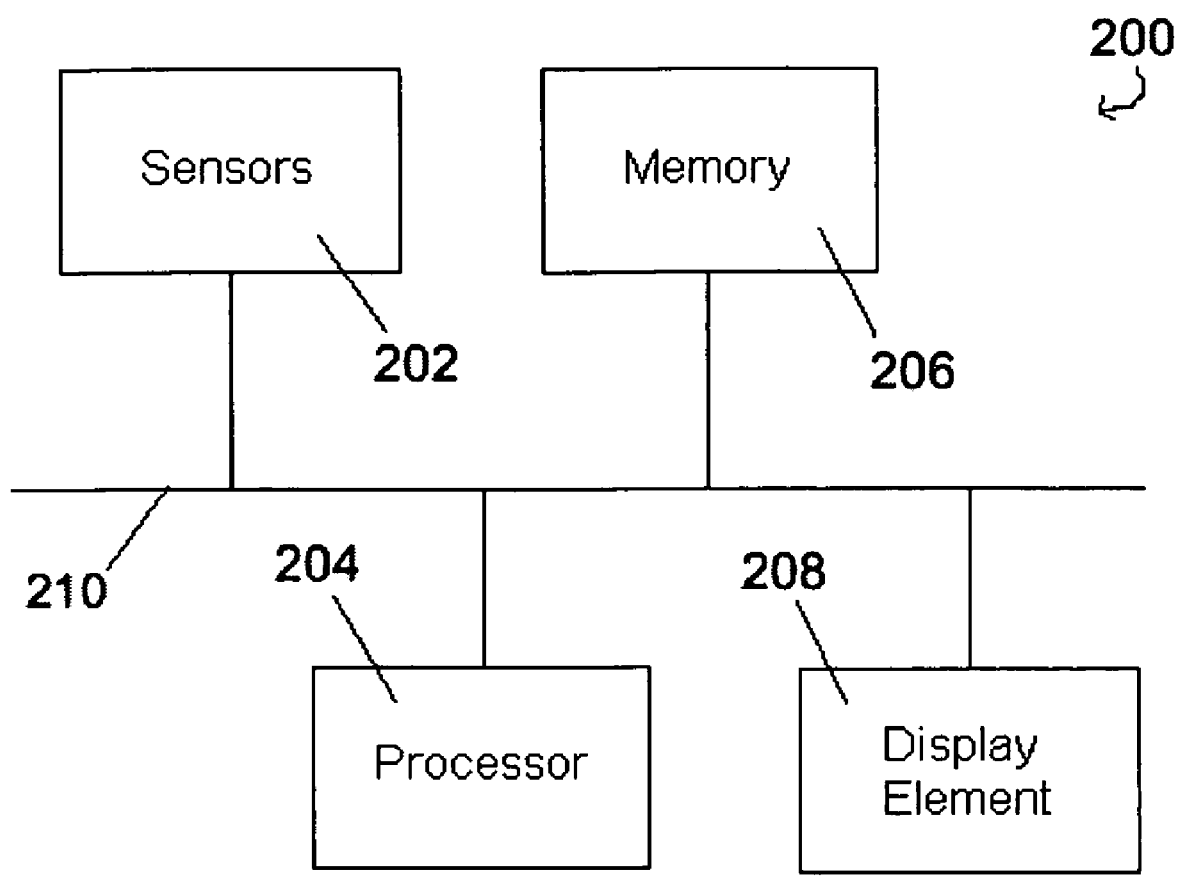
FIG. 2 is a block diagram of a graphic display system according to one embodiment of the present invention.

FIG. 2 is a block diagram of a graphic display system according to one embodiment of the present invention. In FIG. 2, an exemplary graphical display system 200 includes processor 204 configured to provide data for display to display element 208. One or more data sources are coupled to processor 204 via bus 210. These data sources include, but are not limited to, sensors 202 and memory 206. In some embodiments, one or more of these data sources are omitted. In some embodiments, sensors 202 are used to provide data to processor 204 for use by processor 204 in calculating and displaying a craft's deviation from an intended flight path. For example, in some embodiments, sensors 202 provide data regarding lateral deviation, attitude, and heading data. In other embodiments, sensors 202 are also used to provide data to processor 204 for display on display element 208. For example, in some embodiments, sensors 202 provide photographs and digital images of terrain for display on display element 208. Sensors 202 include, but are not limited to, barometric altimeters, radar altimeters, cameras, global positioning system (GPS) receivers, speedometers, etc.

Memory 206 includes any type of suitable medium such as floppy disks, conventional hard disks, CD-ROM, flash memory ROM, nonvolatile ROM, RAM, or other suitable medium. Processor 204 and memory 206 are coupled together allowing processor 204 to write to and store data in memory 206 as well as retrieve stored data from memory 206. In one embodiment, memory 206 stores data received by processor 204 from sensors 202. In other embodiments, memory 206 temporarily stores data to be transmitted from processor 204 to display element 208. In other embodiments, memory 206 is used to store a database of graphics for retrieval by processor 204 and display on display element 208. In yet other embodiments, memory 206 is used to store data regarding current and past calculated display positions of a lateral deviation symbology.

Processor 204 includes or interfaces with hardware components that support the graphics display system. By way of example and not by way of limitation, these hardware components include one or more microprocessors, graphics processors, memories, storage devices, interface cards, and other standard components known in the art. Additionally, processor 204 includes or functions with software programs, firmware or computer readable instructions for carrying out various methods, process tasks, calculations, control functions, and the generation of display signals and other data used in the operation of the display system. These programs, firmware, or instructions are typically stored on any appropriate medium used for storage of computer readable instructions such as floppy disks, conventional hard disks, CD-ROM, flash ROM, nonvolatile ROM, RAM, and other like medium.

These instructions include instructions for assigning positional boundaries, calculating display position of a lateral deviation symbology, and determining if calculated positions of a lateral deviation symbology are allowed based on where the lateral devation symbology would be displayed, if allowed, in relation to positional boundaries, as described above with respect to FIG. 1. The instructions also include instructions for transitioning between a lateral deviation symbology and a lateral deviation indicator based on the determination if calculated display positions of the lateral deviation symbology are allowed or not. Transitioning between a lateral deviation symbology and a lateral deviation indicator comprises fading in and out the lateral deviation symbology and lateral deviation indicator, as described above with respect to FIG. 1. In some embodiments, these instructions are stored on memory 206.

Display element 208 includes any display element suitable for displaying the various symbols and information for the operation of embodiments of the present invention. There are many known display elements that are suitable for this task, such as various CRT, active and passive matrix LCD, organic LED, and other existing or later developed display technology. Processor 204 is coupled to and sends appropriate signals to display element 208. These signals instruct display element 208 to display craft lateral deviation data and when to transition between a lateral deviation symbology and a lateral deviation indicator according to embodiments of the present invention.

Figure 3:
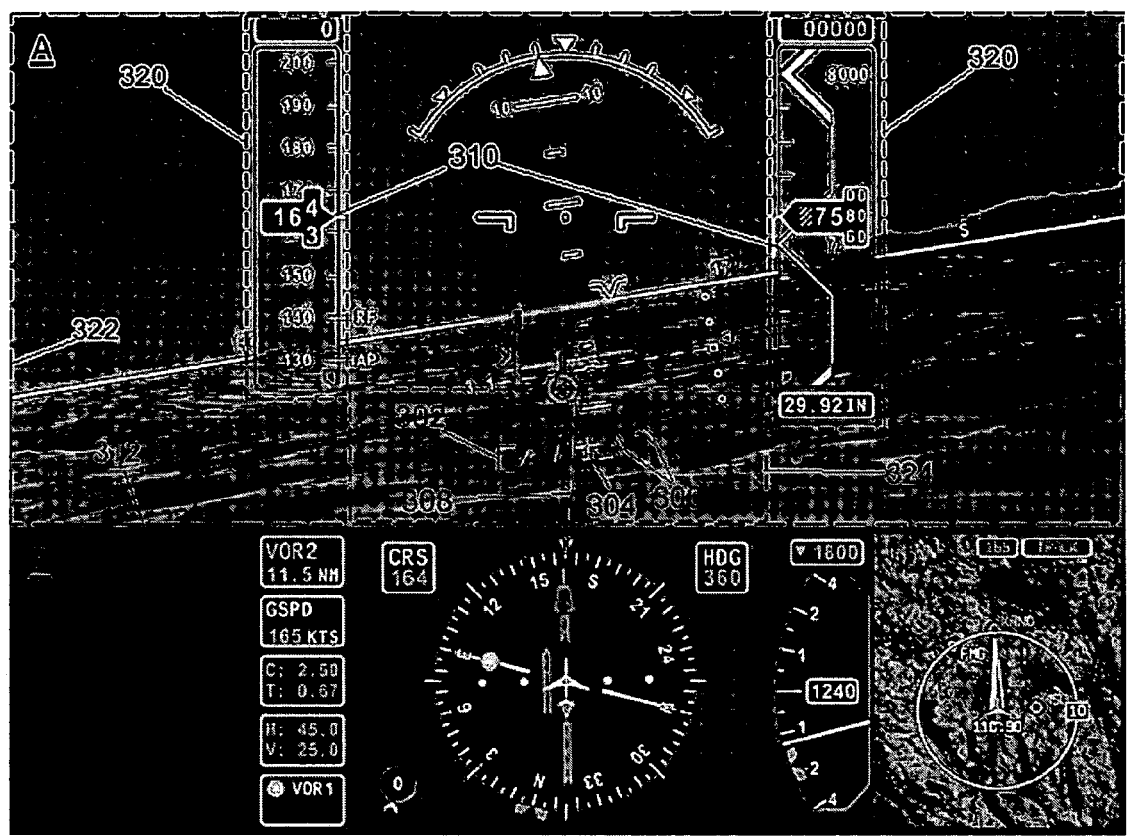
FIG. 3 is an image of a graphical display with lateral deviation symbology according to one embodiment of the present invention.

FIG. 3 is an image of a graphical display with lateral deviation symbology according to one embodiment of the present invention. Depicted in FIG. 3 is lateral deviation symbology 302. Lateral deviation symbology 302 contains aircraft symbol 304 and deviation bars 306. In some embodiments, not including a partially conformal lateral deviation symbology, aircraft symbol 304 is maintained substantially aligned with a center point of lateral deviation symbology 302. In such embodiments, lateral deviation is indicated based on the position of center line 308 in relation to aircraft symbol 304 and deviation bars 306. Lateral deviation symbology 302 moves relative to center line 308 to indicate the aircraft's current deviation from an intended flight plan. In some embodiments, lateral deviation symbology 302 is fully conformal. In such embodiments, separations between deviation bars 306 represent specific ground distances. Therefore the distance between deviation bars 306 varies based on the heading and attitude of the aircraft. In other embodiments, lateral deviation symbology 302 is not fully conformal and the distance between deviation bars 306 is a set display distance regardless of aircraft attitude and heading.

Also shown in FIG. 3, for purposes of explanation only, are exemplary positional boundaries 320, 322, and 324. In some embodiments, only one of positional boundaries 320, 322, and 324 are used. In other embodiments, more than one of positional boundaries 320, 322, and 324 are used. In yet other embodiments, other positional boundaries are used. Positional boundary 320 defines an area about primary flight symbology 310. In FIG. 3, primary flight symbology 310 comprises PFD tapes. If lateral deviation symbology 302 enters the area marked by positional limit 320, lateral deviation symbology 302 will overlap primary flight symbology 310. In embodiments using positional boundary 320, lateral deviation symbology 302 is faded out if a calculated display position would locate lateral deviation symbology 302 within the area marked by positional boundary 320. Positional boundary 322 includes boundaries of the viewing area of the display in FIG. 3 as well as border 312 dividing the viewing area into sections A and B, wherein section A contains perspective conformal graphics. If a calculated display position would locate lateral deviation symbology 302 off of the display element in FIG. 3 or outside of section A, lateral deviation symbology 302 is faded out.

Figure 4:
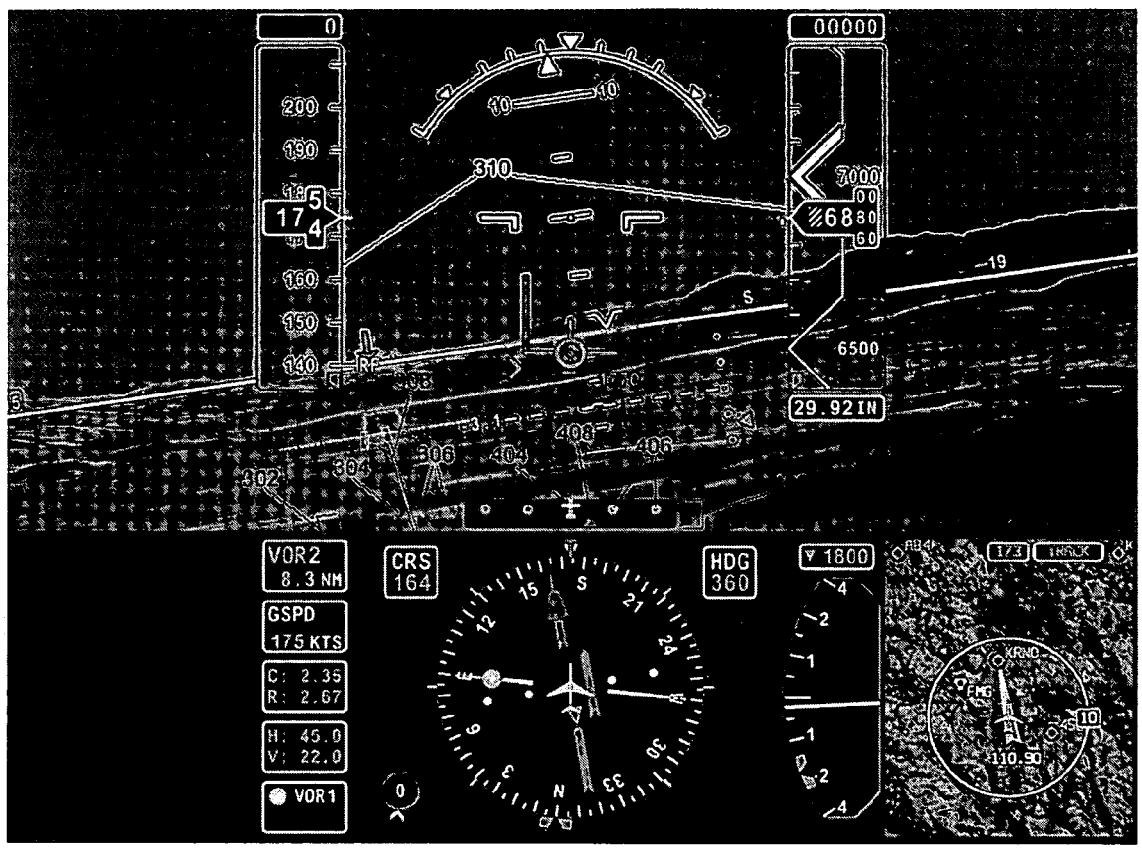
FIG. 4 is an image of a graphical display with lateral deviation symbology according to one embodiment of the present invention.

Positional boundary 324 defines an area of section A wherein lateral deviation symbology 302 is allowed to move. Hence, in the embodiment in FIG. 3, positional boundary 324 limits the horizontal movement of lateral deviation symbology 302 to movement approximately between primary flight symbology 310. Additionally positional boundary 324 limits the vertical movement of lateral deviation symbology 302 approximately between border 312 and a boundary aligned substantially with a lower end of primary flight symbology 310. If a calculated display position would place lateral deviation symbology 302 outside of the area defined by positional boundary 324, the calculated position is not allowed and lateral deviation symbology 302 is faded out. In all embodiments, when lateral deviation symbology 302 is faded out, a lateral deviation indicator is faded in. An exemplary lateral deviation indicator is shown in FIG. 4. In practice, positional limits 320, 322, and 324 are not displayed.

FIG. 4 is an image of a graphical display with lateral deviation symbology according to one embodiment of the present invention. In FIG. 4, lateral deviation symbology 302 has crossed a positional boundary and is beginning to fade out of the display in FIG. 4. Also, lateral deviation indicator 402 is beginning to fade into the display in FIG. 4. Deviation circles 406 perform a similar function in lateral deviation indicator 402 as deviation bars 306 perform in lateral deviation symbology 302. That is, deviation circles represent an amount of deviation from an intended flight path. Likewise aircraft symbol 404 performs a similar function as aircraft symbol 304. In some embodiments, lateral deviation indicator 404 is neither fully nor partially conformal to center line 308. That is, lateral deviation indicator 404 does not move relative to center line 308 and separations between deviation circles does not change due to craft state changes. Knob 408 performs the function of center line 308. Knob 408 represents the position of the intended flight in lateral deviation indicator 404. Hence, lateral deviation indicator 402 indicates general lateral deviation based on the position of knob 408 in relation to aircraft symbol 404 and deviation circles 406. In some embodiments, lateral deviation indicator 402 fades into a horizontal center position as shown in FIG. 4. In other embodiments, lateral deviation indicator 402 fades into a position related to where lateral deviation symbology 302 faded out.

Lateral deviation indicator 402 enables flight crews to maintain awareness of lateral deviation even in situations when lateral deviation symbology 302 is not displayed due to aircraft state changes. By using positional boundaries, embodiments of the present invention can dynamically transition between lateral deviation symbology 302 and lateral deviation indicator 402. Therefore, embodiments of the present invention enable flight crews to continuously determine position information even when lateral deviation symbology 302 disappears from a display through transitions between lateral deviation symbology 302 and lateral deviation indicator 402. Additionally, in some embodiments, positional boundaries help avoid confusion and display clutter by preventing lateral deviation symbology from overlapping other primary flight display symbology. Dynamically fading between lateral deviation symbology 302 and lateral deviation indicator 402 based on positional boundaries reduces flight crew surprise during transitions between lateral deviation indicator 402 and lateral deviation symbology 302.

Figure 5:
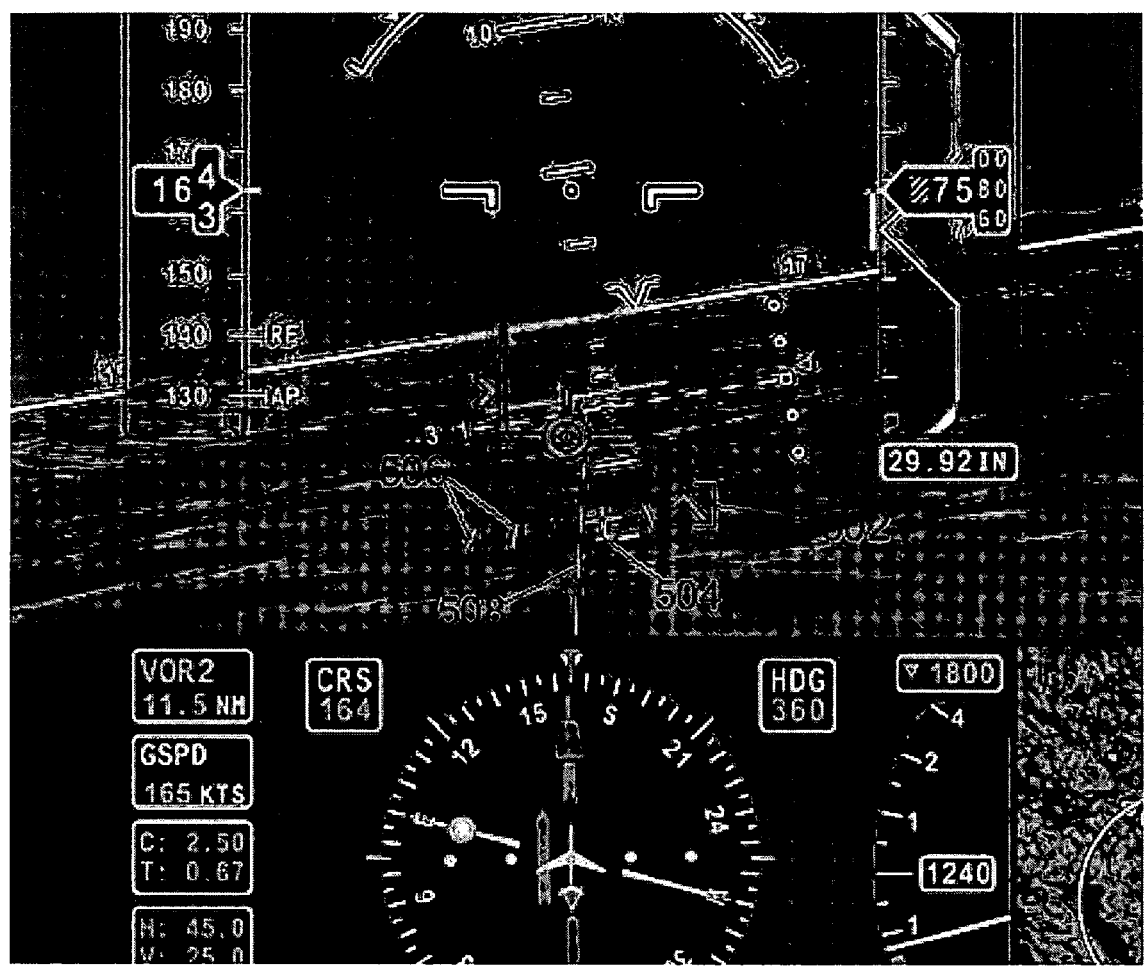
FIG. 5 is an image of a graphical display with a partially conformal lateral deviation symbology according to one embodiment of the present invention.

FIG. 5 is an image of a graphical display with a partially conformal lateral deviation symbology according to one embodiment of the present invention. In FIG. 5, a partially conformal lateral deviation symbology 502 is shown. Lateral deviation symbology 502 includes aircraft symbol 504 and deviation bars 506. As shown in FIG. 5, center line 508 is substantially aligned with a center point of lateral deviation symbology 502. As the craft changes state, lateral deviation symbology 502 moves with center line 508 maintaining center line 508 substantially aligned with a center point of lateral deviation symbology 502. Additionally, separations between deviation bars 506 remain substantially constant regardless of craft state changes. Lateral deviation is indicated as aircraft symbol 504 moves over lateral deviation symbology 502 in relation to center line 508 and deviation bars 506. Aircraft symbol 504 moves with and relative to lateral deviation symbology 502 and center line 508 as the craft changes state to indicate lateral deviation.

Figure 6:
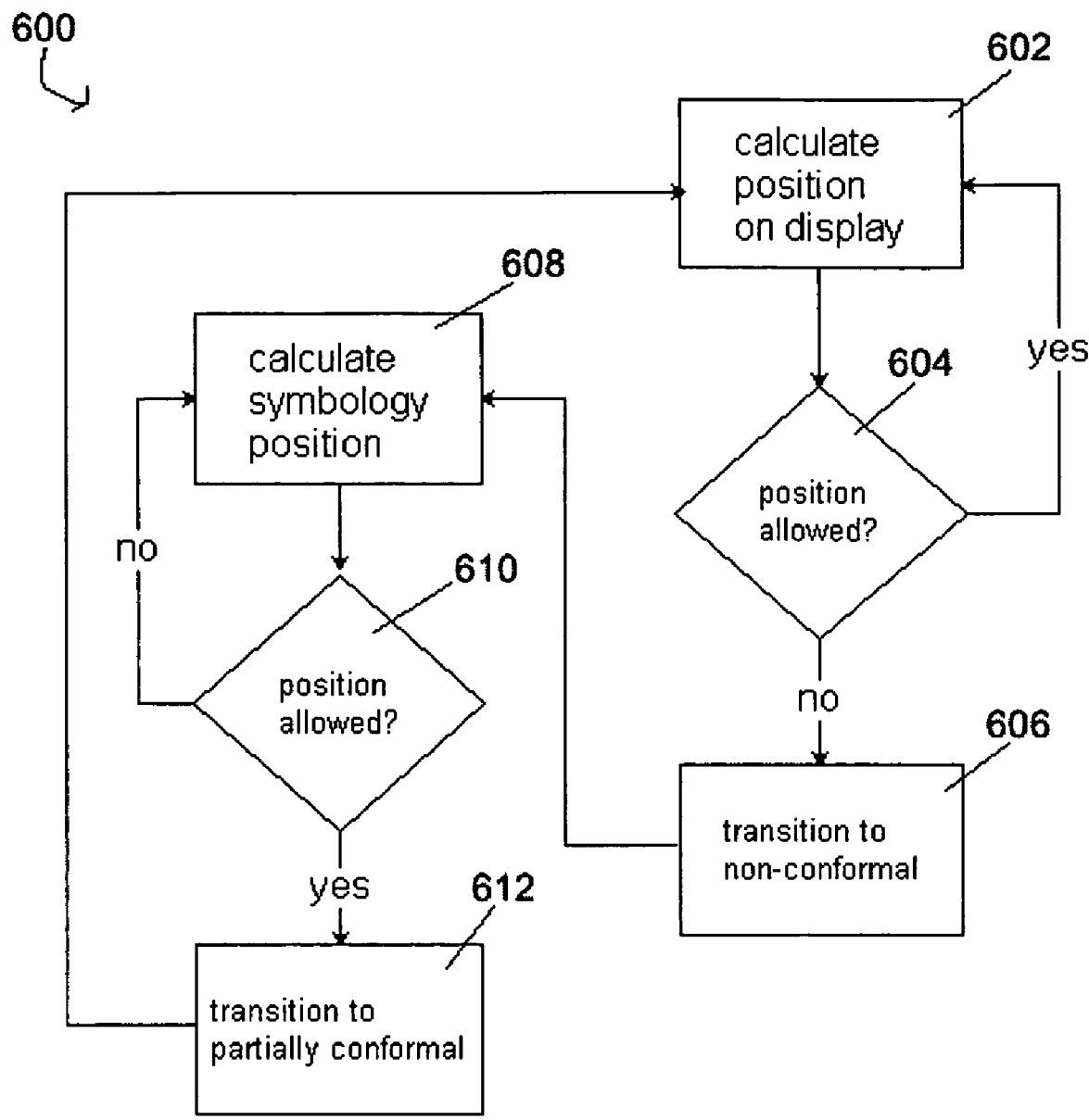
FIG. 6 is a flow chart showing a method 600 of dynamically displaying lateral deviation in formats on a display according to one embodiment of the present invention.

FIG. 6 is a flow chart showing a method 600 of dynamically displaying lateral deviation in formats on a display according to one embodiment of the present invention. At 602, a display position for a partially conformal lateral deviation symbology is calculated. Partially conformal means that the center point of the lateral deviation symbology is tied to the center line. However, deviation bars about the center line are not conformal. The distance between the deviation bars is a fixed distance on the display and remains the same as the craft's state changes. However, as the craft's state changes the partially conformal lateral deviation symbology will move relative to the center line with the center of the partially conformal lateral deviation symbology being tied to the center line.

At 604, it is determined if calculated display positions of the partially conformal lateral deviation symbology are allowed based on where the lateral devation symbology would be displayed, if allowed, in relation to areas defined by positional boundaries, as described above. If it is determined that the calculated display position of the lateral deviation symbology is allowed, the process returns to 602 where an updated display position of the lateral deviation symbology is calculated. If it is determined that the calculated display position of the lateral deviation symbology is not allowed, the process continues at 606.

At 606, the partially conformal lateral deviation symbology transitions from a partially conformal lateral deviation symobolgy to a non-conformal lateral deviation symbology. Transitioning to a non-conformal lateral deviation symbology includes terminating the center line a small distance above the lateral deviation symbology leaving a gap between the center line and the lateral deviation symbology. The section of the center line which intersects with lateral deviation symbology continues to be displayed with lateral deviation symbology. Terminating the center line a small distance above lateral deviation symbology indicates to an operator that lateral deviation symbology is no longer conformal to the center line. In some embodiments, the center line terminates a ¼ inch above the lateral deviation symbology. The lateral deviation symbology does not fade out of the display, but the lateral deviation symbology remains in a fixed position where it transitioned to a non-conformal lateral deviation symbology rather than moving about the display with the center line. However, the non-conformal lateral deviation symbology continues to indicate lateral deviation with an aircraft symbol, deviation bars and the section of center line still displayed with with lateral deviation symbology as described above with regards to FIG. 5.

At 608, based on changes in the craft's state, an updated display position is calculated for the lateral deviation symbology. The position is calculated using techniques known to one of skill in the art. At 610, it is determined if the updated display position is allowed based on where the lateral devation symbology would be displayed, if allowed, in relation to positional boundaries, as described above. If the updated position is not allowed, the method returns to 608 where a new updated display position is calculated based on changes in the craft's state. If the updated display position is allowed, the method continues at 612. At 612, the lateral deviation symbology transitions back to a partially conformal lateral deviation symbology such that the center line again intersects the lateral deviation symbology and lateral deviation symbology is again conformal to the center line, moving about the display with the center line. The process then returns to 602 where a new updated display position of the lateral deviation symbology is calculated.

Although specific embodiments have been illustrated and described herein, it will be appreciated by those of ordinary skill in the art that any arrangement, which is calculated to achieve the same purpose, may be substituted for the specific embodiment shown. For example, although the specific embodiments illustrated are directed at aircraft, the method and apparatus may be used in various embodiments employing various types of crafts, such as space craft, helicopters, and UAVs. This application is intended to cover any adaptations or variations of the present invention. Therefore, it is manifestly intended that this invention be limited only by the claims and the equivalents thereof.

What is claimed is:

1. A method of dynamically displaying lateral deviation in formats on a display, the method comprising:

assigning one or more positional boundaries for displaying the lateral deviation information, wherein the one or more positional boundaries define areas on a display;

calculating display positions of a lateral deviation symbology;

determining if each calculated display position is allowed based on where the lateral deviation symbology would be located, if displayed at each calculated position, in relation to the one or more positional boundaries;

displaying the lateral deviation symbology at the calculated display positions when the calculated positions are allowed; and displaying a lateral deviation indicator when the calculated positions are not allowed.

2. The method of claim 1, wherein displaying the lateral deviation symbology includes displaying one of a fully conformal lateral deviation symbology and a partially conformal lateral deviation symbology.

3. The method of claim 1, wherein determining if each calculated display position is allowed includes at least one of:

determining that a calculated display position is not allowed if at least a part of the lateral deviation symbology would be located within an area defined by the one or more positional boundaries; and determining that a calculated display position is not allowed if at least a part of the lateral deviation symbology would not be located within an area defined by the one or more positional boundaries.

4. The method of claim 1, wherein displaying the lateral deviation symbology includes:

fading out the lateral deviation indicator if on the display; and fading in the lateral deviation symbology if not on the display.

5. The method of claim 4, wherein fading out lateral deviation indicator and fading in the lateral deviation symbology includes one of:

fading in the lateral deviation symbology and fading out the lateral deviation indicator at a substantially uniform rateover a set period of time; and fading in the lateral deviation symbology and fading out the lateral deviation indicator at a rate based on a rate of craft state change.

6. The method of claim 1, wherein displaying the lateral deviation indicator includes:

fading in the lateral deviation indicator if not on the display; and fading out the lateral deviation symbology if on the display.

7. The method of claim 6, wherein fading in the lateral deviation indicator and fading out the l lateral deviation symbology includes one of:

fading out the lateral deviation symbology and fading in the lateral deviation indicator at a substantially uniform rate over a set period of time; and fading out the lateral deviation symbology and fading in the lateral deviation indicator at a rate based on a rate of craft state change.

8. The method of claim 6, wherein fading in the lateral deviation indicator includes one of:

fading in the lateral deviation indicator at a horizontal center point on the display; and fading in the lateral deviation indicator at a position related to a position where the lateral deviation symbology was faded out.

9. A graphic display system comprising:

one or more sensors for collecting craft lateral deviation data;

a display element for displaying craft lateral deviation data; and at least one processor coupled to the one or more sensors and the display element for processing the lateral deviation data and sending signals to the display element to direct the display element in displaying the lateral deviation data, wherein the processor calculates display positions for a lateral deviation symbology, determines if each of the calculated display positions are allowed, and sends signals to the display element to display the lateral deviation symbology at the calculated display positions when the calculated display positions are allowed, and sends signals to the display element to display a lateral deviation indicator when the calculated display positions are not allowed.

10. The graphic display system of claim 9 wherein, the processor calculates display positions for one of a fully conformal lateral deviation symbology and a partially conformal lateral deviation symbology.

11. The graphic display system of claim 9, wherein the at least one processor determines if each of the calculated display positions is allowed by at least one of:

determining that a calculated display position is not allowed if, at the calculated display position, at least a part of the lateral deviation symbology would be located within an area defined by positional boundaries on the display element; and determining that a calculated display position is not allowed if, at the calculated display position, at least a part of the lateral deviation symbology would not be located within an area defined by positional boundaries on the display element.

12. The graphic display system of claim 9, wherein signals to the display element to display the lateral deviation symbology at the calculated display positions include:

signals to fade out the lateral deviation indicator if on the display; and signals to fade in the lateral deviation symbology if not on the display.

13. The graphic display system of claim 12, wherein signals to fade out the lateral deviation indicator and signals to fade in the lateral deviation symbology include one of:

signals to fade in the lateral deviation symbology and fade out the lateral deviation indicator at a substantially uniform rate over a set period of time; and signals to fade in the lateral deviation symbology and fade out the lateral deviation indicator at a rate based on a rate of craft state change.

14. The graphic display system of claim 9, wherein signals to the display element to display the lateral deviation indicator include:

signals to fade in the lateral deviation indicator if not on the display; and signals to fade out the lateral deviation symbology if on the display.

15. The graphic display system of claim 14, wherein the signals to fade in the lateral deviation indicator include one of:

signals to fade in the lateral deviation indicator at a horizontal center position on the display element; and signals to fade in the lateral deviation indicator at a position related to a position where the lateral deviation symbology is faded out.

16. The graphic display system of claim 14, wherein signals to fade in the lateral deviation indicator and signals to fade out the lateral deviation symbology include one of:

signals to fade out the lateral deviation symbology and fade in the lateral deviation indicator at a substantially uniform rate over a set period of time; and signals to fade out the lateral deviation symbology and fade in the lateral deviation indicator at a rate based on a rate of craft state change.

17. A computer readable medium having computer-executable instructions for performing a method of dynamically displaying lateral deviation in formats on a display, the method comprising:

determining if calculated display positions of a lateral deviation symbology are allowed based on the location of the lateral deviation symbology, if displayed at the calculated display positions, in relation to areas defined on a display by positional boundaries; and transitioning between the lateral deviation symbology and a lateral deviation indicator based on the determination if calculated display positions are allowed.

18. The computer readable medium of claim 17, determining if calculated display positions of a lateral deviation symbology are allowed includes one of determining if calculated display positions of a partially conformal lateral deviation symbology are allowed and determining if calculated display positions of a fully conformal lateral deviation symbology are allowed.

19. The computer readable medium of claim 17, wherein transitioning between a lateral deviation symbology and a lateral deviation indicator further comprises:

transitioning at a rate based on one of, a substantially uniform rate over a set time period, and a rate of craft state change.

20. The computer readable medium of claim 17, wherein determining if calculated display positions of a lateral deviation symbology includes at least one of:

determining that calculated display positions are not allowed if, at the calculated display positions, at least a part of the lateral deviation symbology would be located within an area defined by the positional boundaries; and determining that calculated display positions are not allowed if, at the calculated display positions, at least a part of the lateral deviation symbology would not be located within an area defined by the positional boundaries.

21. The computer readable medium of claim 17, wherein transitioning between a lateral deviation symbology and a lateral deviation indicator includes:

fading out the lateral deviation symbology, if on the display, for calculated display positions determined to be not allowed;

fading in the lateral deviation indicator, if not on the display, for calculated display positions determined to be not allowed;

fading in the lateral deviation symbology, if not on the display, for calculated display positions determined to be allowed; and fading out the lateral deviation indicator, if on the display, for calculated display positions determined to be allowed.

22. The computer readable medium of claim 21, wherein fading in a lateral deviation indicator comprises:

fading in a lateral deviation indicator at one of, a horizontal center position on a display element, and a position related to a position where the lateral deviation symbology is faded out.

23. A method of dynamically displaying lateral deviation in formats on a display, the method comprising:

assigning one or more positional boundaries for displaying the lateral deviation information, wherein the one or more positional boundaries define areas on a display;

calculating display positions of a partially conformal lateral deviation symbology;

determining if each calculated display position is allowed based on where the partially conformal lateral deviation symbology would be located, if displayed at each calculated position, in relation to the one or more positional boundaries;

displaying the partially conformal lateral deviation symbology at the calculated display positions when the calculated positions are allowed; and transitioning the partially conformal lateral deviation symbology to a non-conformal lateral deviation symbology when the calculated positions are not allowed.

24. The method of claim 23 wherein transitioning the partially conformal lateral deviation symbology to a non-conformal lateral deviation symbology includes;

terminating a center line above the lateral deviation symbology; and fixing the position of the lateral deviation symbology at a position where the lateral deviation symbology transitioned to a non-conformal lateral deviation symbology.

25. A graphic display system comprising:

means for collecting craft lateral deviation data;

means for displaying craft lateral deviation data in a lateral deviation symbology; and means for determining if a calculated display position of the lateral deviation symbology is allowed based on where the lateral deviation symbology would be displayed, if at the calculated display position, in relation to at least one area defined by positional boundaries, and for transitioning the lateral deviation symbology to a lateral deviation indicator when the calculated display position of the lateral deviation symbology is not allowed.

* * * * *

UNITED STATES PATENT AND TRADEMARK OFFICE
CERTIFICATE OF CORRECTION

| | | |
|---|---|---|
| PATENT NO. | : 7,432,828 B2 | Page 1 of 1 |
| APPLICATION NO. | : 11/353555 | |
| DATED | : October 7, 2008 | |
| INVENTOR(S) | : Gang He et al. | |

It is certified that error appears in the above-identified patent and that said Letters Patent is hereby corrected as shown below:

Column 11, Line 5, "out the 1 lateral" should be changed to --out the lateral--.

Signed and Sealed this

Seventeenth Day of February, 2009

JOHN DOLL
*Acting Director of the United States Patent and Trademark Office*